Dec. 7, 1965 V. G. BELL, JR., ETAL 3,221,653
OPEN THROAT BED AND CYLINDER IMPRINTING MACHINE
Filed Oct. 15, 1962 5 Sheets-Sheet 1
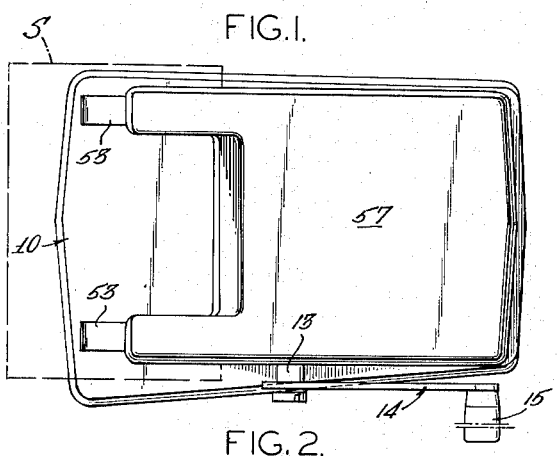
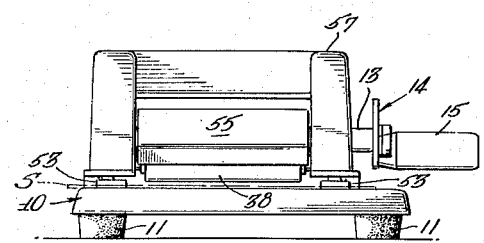
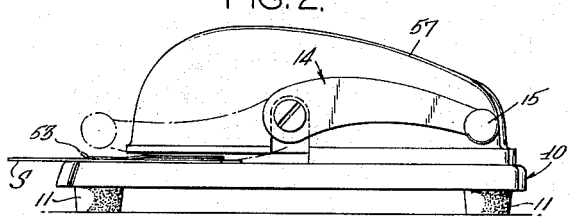
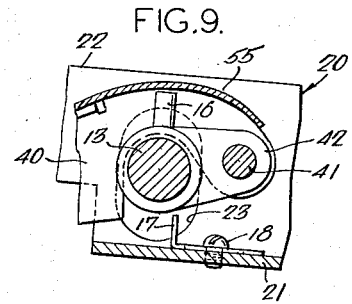
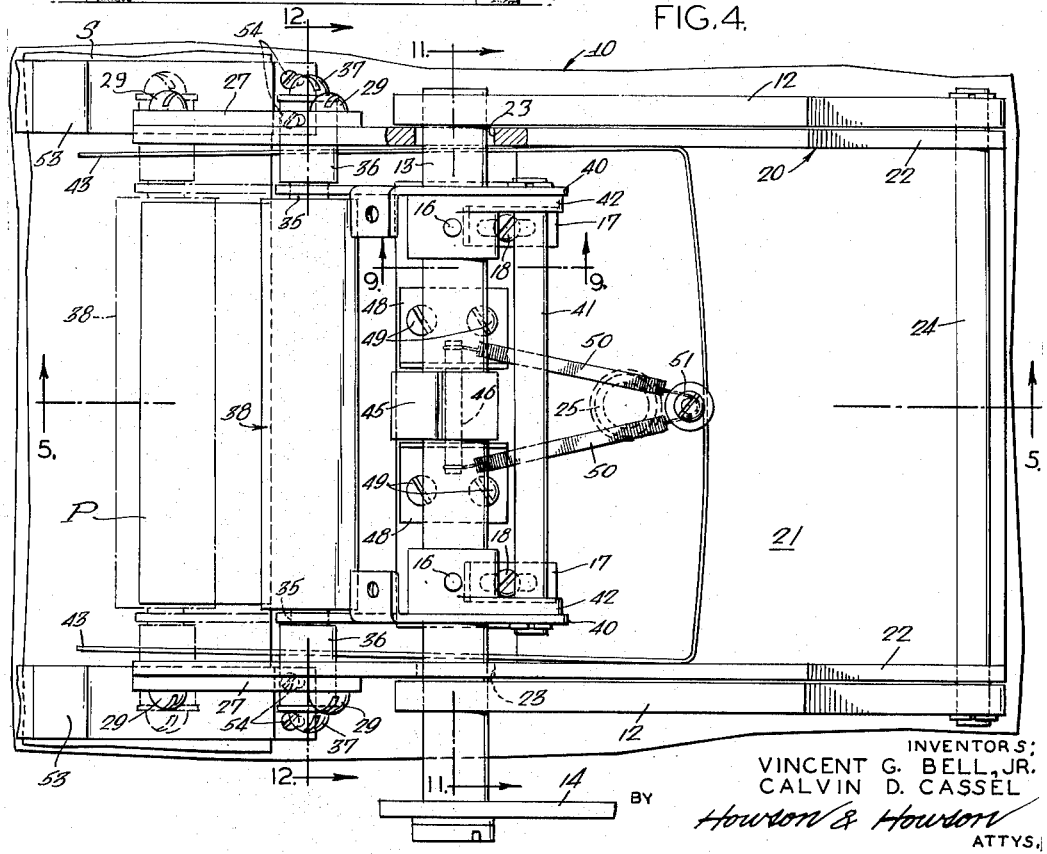
INVENTORS:
VINCENT G. BELL, JR.
CALVIN D. CASSEL
BY Howson & Howson
ATTYS.

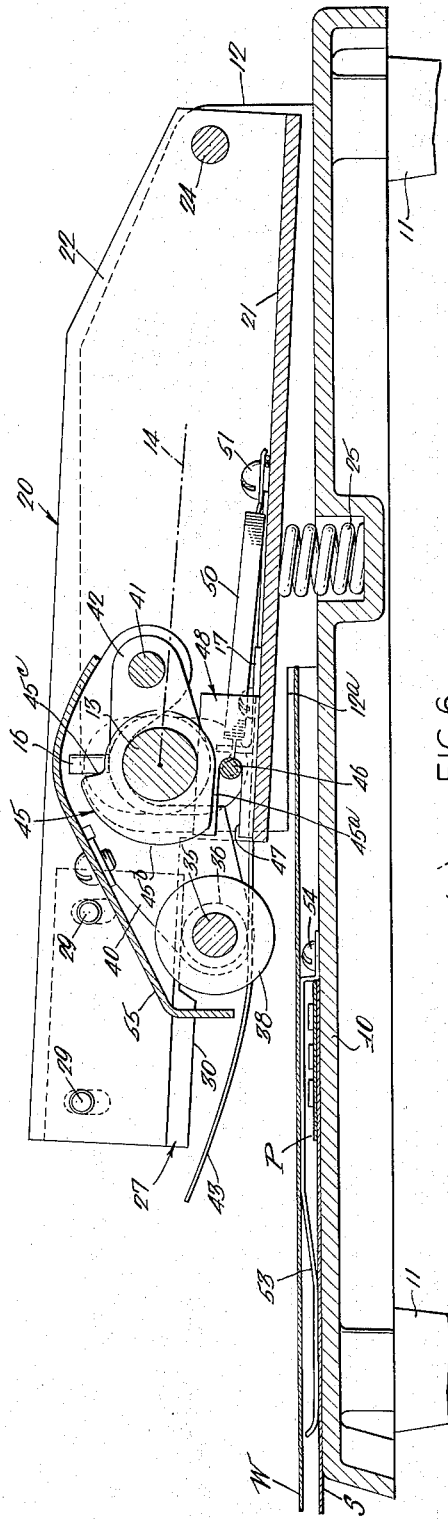

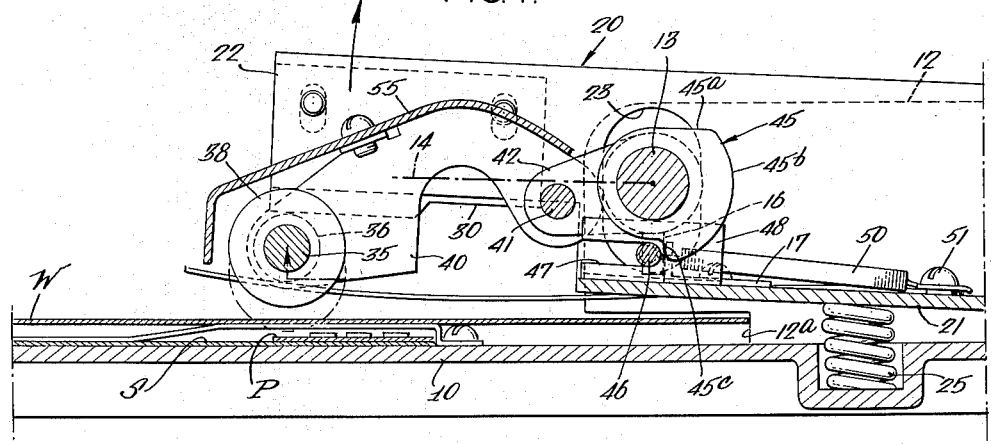
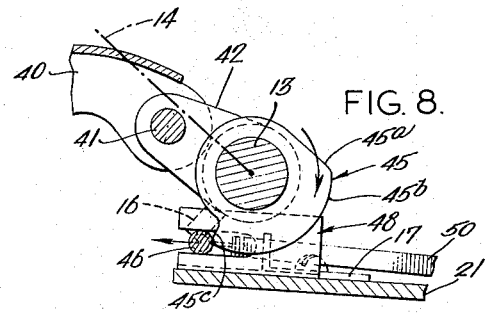
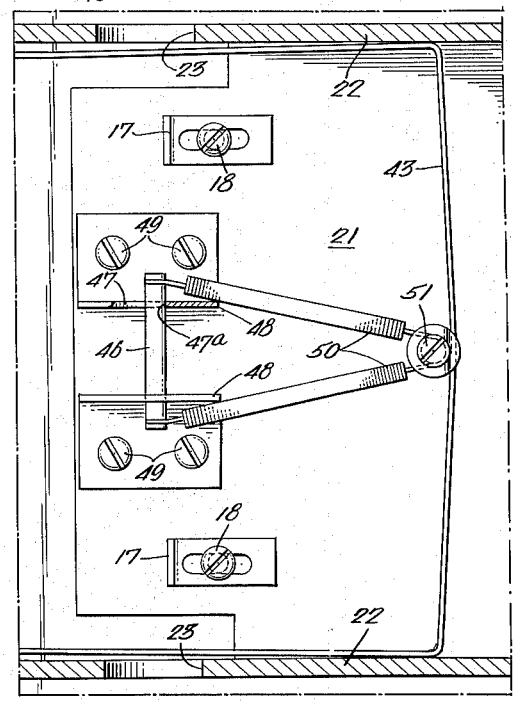
INVENTORS:
VINCENT G. BELL, JR.
CALVIN D. CASSEL

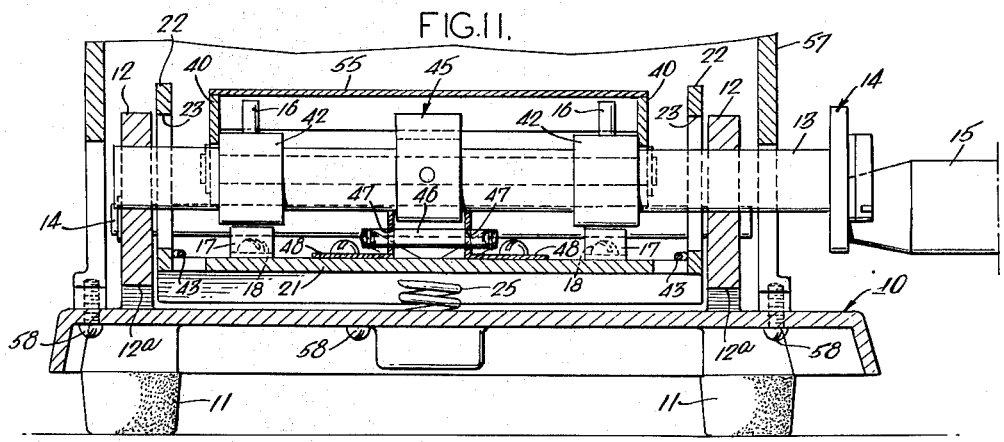
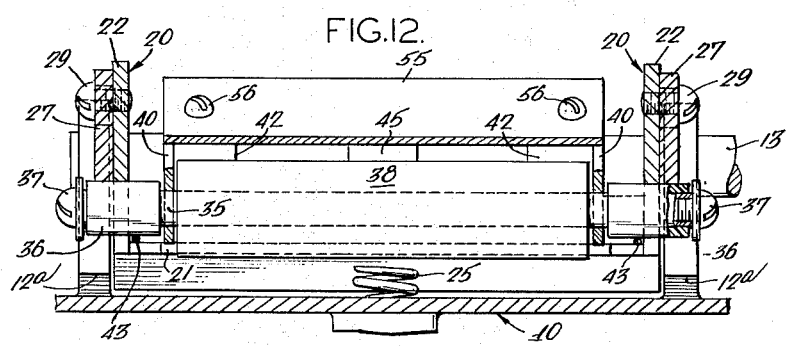
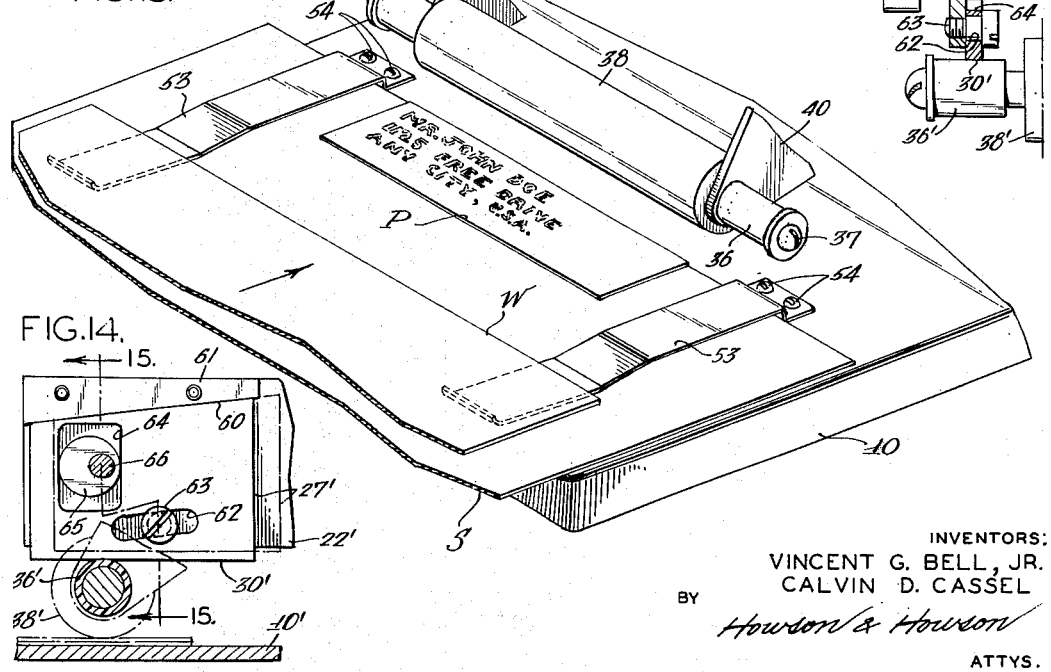

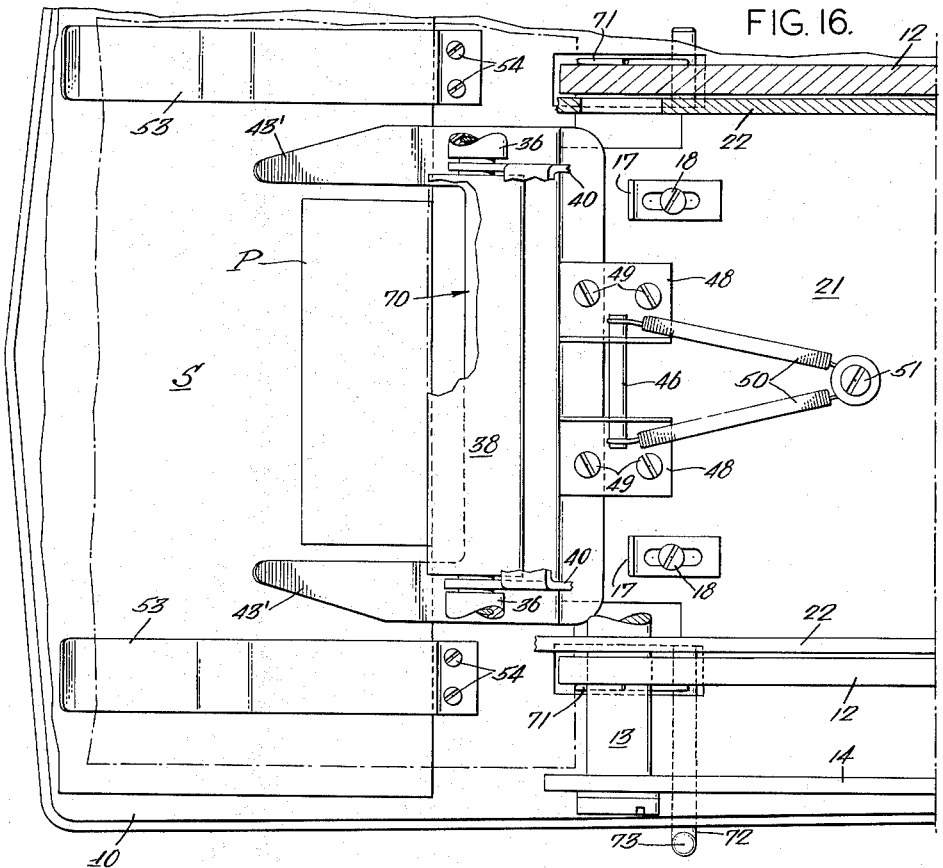
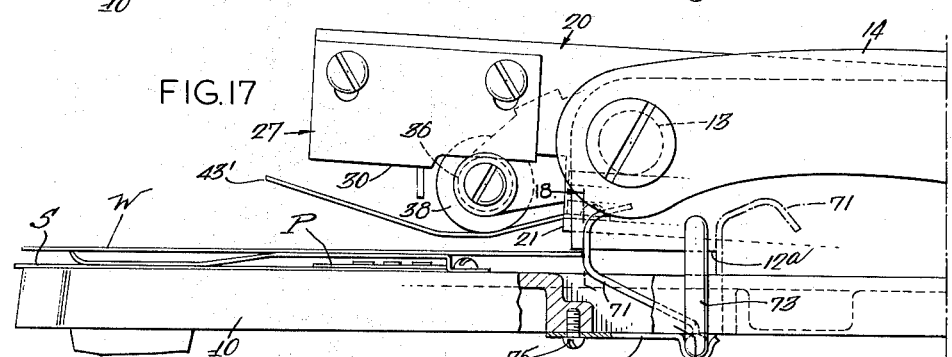
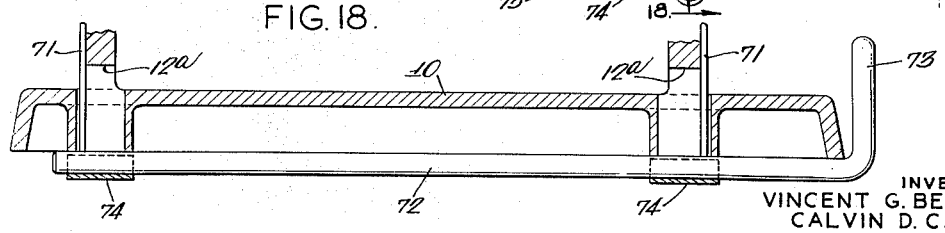
INVENTORS
VINCENT G. BELL, JR.
CALVIN D. CASSEL
BY Howson & Howson
ATTYS.

United States Patent Office 3,221,653
Patented Dec. 7, 1965

3,221,653
OPEN THROAT BED AND CYLINDER
IMPRINTING MACHINE
Vincent G. Bell, Jr., Wayne, and Calvin D. Cassel, Gardenville, Pa., assignors to Safeguard Corporation, Lansdale, Pa., a corporation of Pennsylvania
Filed Oct. 15, 1962, Ser. No. 230,560
8 Claims. (Cl. 101—269)

This invention relates to an imprinting machine, especially to an imprinting machine having an open throat or side for the reception of printing elements and inserted sheets to be imprinted, and has for an object the provision of improvements in this art.

The invention provides a machine which is entirely open at the front and on both sides at the front to permit the insertion of the heads or sides of sheets of unlimited width or length, the impression being made for the width of an impression roll at any selected portion of the sheets which are inserted to be imprinted.

The invention provides a machine in which the impression roll is normally withdrawn into a casing or cover at the time the material is inserted, the roll moving out over the material to make an impression and then moving back into the casing.

The invention provides hold-down means for the impression roll on its outstroke or printing stroke, the hold-down means relieving the roll from pressure at the front end of the printing stroke so it may return in an elevated position clear of the inserted material.

The invention also provides improved means for holding down and guiding the roll on its printing stroke and for releasing it on its back stroke and also provides means for adjusting the hold-down position to accommodate material or printing elements of different thicknesses.

The invention also provides means for holding up the impression roll on the return stroke so it will not smudge the paper.

The invention also provides means for adjusting the stop position of the inserted paper.

The device is particularly adapted for billing duty where an embossed customer's plate is secured to the head of a master sheet and used for addressing envelopes or bills or both, but may also be provided with a fixed holder on the base of a size to receive a credit card or the like.

The invention will be more completely understood from the following description of an exemplary embodiment and a modified detail, reference being made to the accompanying drawings thereof, wherein:

FIG. 1 is a top plan view of an imprinting machine embodying the invention;

FIG. 2 is a side elevation;

FIG. 3 is a front elevation;

FIG. 4 is an enlarged top plan view with the outer cover removed;

FIG. 5 is a longitudinal vertical section taken on the line 5—5 of FIG. 4;

FIG. 6 is a view like FIG. 5 but showing the imprinting roll in an active position;

FIG. 7 is a partial view like FIG. 5 but showing the imprinting roll in its forward position;

FIG. 8 is a partial view like FIG. 5 but showing the imprinting roll in a released position and on its return stroke;

FIG. 9 is a partial longitudinal vertical section taken on the line 9—9 of FIG. 4;

FIG. 10 is a horizontal section and plan view taken on the line 10—10 of FIG. 6;

FIG. 11 is a transverse vertical section taken on the line 11—11 of FIG. 4;

FIG. 12 is a transverse vertical section taken on the line 12—12 of FIG. 4;

FIG. 13 is a top front side perspective view showing material being inserted for printing;

FIG. 14 is a partial inside elevation and section of a modified hold-down cam adjusting means;

FIG. 15 is a section taken on the line 15—15 of FIG. 14;

FIG. 16 is a top plan view, with parts omitted, to show modified sheet-stop and roll supporting means;

FIG. 17 is a side view of the parts shown in FIG. 16; and

FIG. 18 is a vertical transverse section taken on the line 18—18 of FIG. 17.

As shown in the drawings, the machine comprises a main frame base 10 provided with support pads 11, as of rubber, adapted to be disposed on a table. The machine could be secured instead to a fixed base, if desired. On each side of the base there is a side plate 12, the plates either being made integrally with the base or being rigidly secured thereto.

An operating shaft 13 is turnably mounted in bearings in the side plates 12 and at one end is provided with an operating arm 14 having a handle 15 for oscillating it as required. The shaft 13 could, of course, be operated by power means, if desired.

Between the side plates 12 there is operatively mounted a hold-down cam frame 20 which comprises a bottom plate 21 and upstanding sides 22 which are formed with slots 23 to clear the shaft 13. The sides 22 of the cam frame 20 are pivotally mounted on the side plates 12 of the base by a transversely extending shaft 24. A spring 25 between the base 10 and the bottom plate 21 urges the cam frame upward at the front end about the shaft 24. The upward movement of the cam frame is limited by means to be described hereinafter.

At their front ends the sides 22 of the cam frame are provided with adjustable hold-down cam plates 27 having adjustment slots 28 and secured in adjusted position by screws 29. The cam plates 27 on their lower edges are formed to provide hold-down cams 30 for the ends of an impression roll shaft 35, there being turnable sleeves 36 (as of nylon) on the shaft ends, the sleeves being held on the shaft by retaining screws 37.

An impression roll 38, preferably of a suitable plastic material, impregnated with ink to print on the top sheet of a pack or pad of sheets, is rotatably mounted on the shaft 35.

Operating links 40 are pivotally connected at one end with the roll shaft 35 and at the other end are pivotally connected, as by a transverse shaft 41, to operating arms 42 rigidly secured to the power shaft 13. The links 40 are curved upwardly between their ends and recessed on the lower edge to clear the shaft 13 when the impresssion roll is in its retracted position.

The shaft 35 is constantly urged upward against the hold-down cam by suitably means, as by the leaf springs 43 secured to the cam frame in any suitable way.

Means are provided for holding the cam frame and cams down positively as the impresion roll moves forward and releasing it at the end of the forward stroke. The means herein provided comprises a cam 45 rigidly secured to the shaft 13 and a wedge or sprag roller 46 mounted therebelow in guide slots 47 of brackets 48, secured, as by screws 49, to the top of the plate 21. The wedge roller 46 is constantly urged toward retracted position by springs 50 secured to its ends and attached, as by a screw 51, to the bottom plate 21. The engagement of the top edges of brackets 48 with the shaft 13 constitutes the upper stop position of the cam frame.

The cam 45 has a special shape for performing the required functions. It has an inclined portion 45a of short radius at its inner end where it joins the concentric hub portion which in the rest position of the cam allows the cam frame to rise to an upper position. The impression roll is thereby allowed to rise to a high position so that the edges of inserted material such as a sheet or pad of paper W (including carbon sheets if wanted) may be pushed back beneath the recessed portions 12a of the main frame side plates 12 if required. The normal position of the inserted sheets carrying the printing plate P (FIG. 13) is established by spring guide and stop fingers 53 secured to the base 10, as by screws 54. The sheet to be imprinted is inserted above the fingers 53 to a suitable rear stop position, in FIG. 5 being shown as stopping against the rear side of the recessed portions 12a.

Following the flat portion 45a of the cam in the counterclockwise turning movement of the shaft 13 (as viewed from the handle side), the cam is provided with a raised concentric portion 45b of a larger radius. Finally, there is a substantially radial portion 45c at the end of the raised concentric portion 45b. The radial portion 45c is located at the position in the rotation of the shaft 13 where the impression roll has reached its full forward position after the printing action on the outward stroke, as shown in FIG. 7.

The wedge roller may turn (FIG. 6) as the cam portion 45b engages it while turning counterclockwise but since the wedge roller is held in engagement with the closed end 47a of its guide slots by the counterclockwise turning movement of the cam 45 it holds its wedging position below the axis of the shaft 13 to hold down the cam frame. At the end of the forward movement of the impression roll and at the end of the counterclockwise movement of the handle 14 and shaft 13 the radial portion 45c of the cam passes the wedge roller and allows it and the frame 20 to move up, spring 25 moving the frame up.

When the cam 45 is turned clockwise its radial portion 45c moves the roller forward against its springs. Later the concentric portion 45b holds the wedge roller against return movement as the cam turns clockwise.

Finally, when the inclined portion 45a of the cam turns into proper position the wedge roller can move back into position beneath the cam below the axis of shaft 13 ready for the next operation. The springs 50 cause the roller to snap back into this position. It is thus seen that resetting is automatic.

In several of the views the handle 14 is omitted and the broken line indicating its position is designated by the reference numeral 14.

The shaft 13 is provided with stop pins 16 and the frame 20 is provided with an adjustable stop bracket 17 for at least one of the pins 16, the bracket being secured, as by a screw 18. The stop position is shown in FIG. 7. In the other direction the movement of the handle is stopped by the engagement of the links 40 with the shaft 13, as shown in FIG. 5.

An inner cover 55 is secured over the impression roll and related parts, the cover being secured to the links 40, as by screws 56.

An outer cover 57 is secured over the entire mechanism, the cover being secured to the base 10, as by screws 58.

It may be desirable to provide more rapid adjustment of the hold-down cams than is furnished by the slot and screw arrangement described above. For this purpose, as shown in FIGS. 14 and 15, the cam plates 27' are mounted on the sides 22' of the cam frame. The plates 27' slide on tapered surfaces 60 of adjustment plates 61 secured to the sides 22'. The cam plates 27' are provided with slots 62 for headed retaining screws 63. Other slots 64 of the cam plates 27' receive eccentric cams 65 of an adjustment shaft 66 mounted in bearings in the sides 22'. The shaft 66 is provided with a suitably marked hand knob 67 and the parts have enough friction to remain in position after adjustment.

It will be evident that when the shaft 66 is turned its eccentric cams will move the cam plates 27' along the tapered surface 60 of the adjustment plates 61, the slots 62 being parallel to the surfaces 60 to keep the parts together, and raise or lower the roll hold-down cam surfaces 30'. If desired, the retaining screws 63 may also be used to clamp the cam plates in position.

FIGS. 16 to 18 show modified support springs 43' for the impression roll 38, the springs here being flat wide plate-like elements formed integrally on a support plate 70 secured by the screws 49 and the springs 43' supporting the roll 38 directly instead of being disposed beneath the shaft sleeves 36 of nylon, as in the first form.

Also, adjustable sheet stop fingers 71 are mounted in the open throats 12a, as by being carried on a shaft 72 having a handle 73. The shaft 72 is mounted beneath the base 10 and is frictionally held in place by spring clips 74 secured by screws 75. The fingers 71 are resilient and bear on the sides against the sides of the plates 12 to hold fast in any adjusted position. The clips 74 may also be arranged to provide adjustable friction to hold the shaft against turning.

The operation of the machine should be evident from the foregoing description. The operator places such printing elements, plates, or the like, and the desired sheets with carbon sheets between them in the throat of the machine and pulls the handle forward and then returns it. The printing and resetting for printing again are automatic.

It is thus seen that the invention provides a simple, convenient and reliable imprinting machine which has great versatility as to the kind of work it will do and the kind of printing elements and receptive sheets for imprinting which it will handle.

While one embodiment of the invention, with some modifications, has been described for purposes of illustration, it is to be understood that there may be various embodiments and modifications within the general scope of the invention.

We claim:

1. An imprinting machine, comprising in combination, a main frame having a platen base for holding imprinting elements, an operating shaft mounted for oscillation on said main frame, a cam frame mounted for up and down movement on said main frame, resilient means urging said cam frame upward, hold-down cams carried by said cam frame, an impression roll mounted on a roll shaft having reciprocatory movement under said hold-down cams, operating connections between said roll shaft and said operating shaft for moving the roll shaft back and forth when the operating shaft is oscillated, a wedge cam mounted on said operating shaft, a wedge roller mounted in a guide slot with a closed end on said cam frame, the wedge roller standing below the axis of said operating shaft at times, a spring connected to said wedge roller to urge it against the closed end of said slot in a position below the operating shaft axis, said wedge cam having an inclined camming portion of short radius at its inner end beneath which said wedge roller normally rests when the impression roll is in its retracted or home position, the cam frame and hold-down cams being raised in the home position, said wedge cam having a raised concentric portion following the inclined portion for holding said wedge roller and cam frame down when the roll is moving on its outward printing stroke, said wedge having a radial portion following the concentric portion to allow the wedge roller and cam frame to rise at the end of forward movement of the impression roll, the radial portion and the raised concentric portion holding the wedge roller out of wedging position when the operating shaft is turned reversely to move the impression roll back until the inclined camming portion is reached near the end of the return stroke, the spring then moving the wedge roller back into its position below the axis of the power shaft.

2. An imprinting machine as set forth in claim 1, in which said cam frame is mounted on a pivot axis at the end distant from its hold-down cams, and in which the upward movement of the cam frame is at times stopped by said wedge roller and is stopped at other times by the part providing the slot for said wedge roller.

3. An imprinting machine, comprising in combination, a main frame having a platen base for holding imprinting elements and sheet material to be imprinted by said imprinting elements, an operating shaft mounted for oscillatory turning movement on said main frame, a roll pressure frame mounted for movement toward and from said main frame, an impression roll mounted for movement on said main frame in a position to be moved toward said imprinting elements by said roll pressure frame, means operated by said operating shaft for reciprocating said roll out and back over said imprinting elements, and interacting means arranged between said operating shaft and roll pressure frame for moving said roll pressure frame down on the outstroke of said roll and releasing said roll pressure frame to rise on the back stroke of the roll, said interacting means including a wedge cam on said operating shaft and a wedge roller mounted on said roll pressure frame for selective engagement with said wedge cam, and mounting means on said roll pressure frame for guiding said wedge roller in movement longitudinally of the frame and positioning said wedge roller in response to movement of said wedge cam to raise and lower said roll pressure frame.

4. An imprinting machine, comprising in combination, a main frame having a base for supporting printing elements and sheets to be imprinted by said printing elements, a shiftable cam frame mounted on said base having forwardly projecting sides extending out over the printing area where the printing elements are supported, said cam frame sides each carrying a cam plate having a longitudinally hold-down cam on the lower surface over the printing area, an impression roll mounted on a roll shaft arranged for traversing movement beneath said hold-down cams, means for moving the roll shaft and impression roll on a forward printing stroke and a return idle stroke beneath said hold-down cams, roll shifting means for holding said shaft and impression roll down under pressure by said hold-down cams on the forward printing stroke and relieving the hold-down pressure on the return idle stroke of the shaft an impression roll, and means for adjusting the height of said hold-down cam plates, said adjusting means including a slot and clamp screw mounting between each cam plate and the side of the cam frame on which it is mounted.

5. An imprinting machine, comprising in combination, a main frame having a base for supporting printing elements and sheets to be imprinted by said printing elements, a shiftable cam frame mounted on said base having forwardly projecting sides extending out over the printing area where the printing elements are supported, said cam frame sides each carrying a cam plate having a longitudinal hold-down cam on the lower surface over the printing area, an impression roll mounted on a roll shaft arranged for traversing movement beneath said hold-down cams, means for moving the roll shaft and impression roll on a forward printing stroke and a return idle stroke beneath said hold-down cams, roll shifting means for holding said shaft and impression roll down under pressure by said hold-down cams on the forward printing stroke and relieving the hold-down pressure on the return idle stroke of the shaft and impression roll, and means for adjusting the height of said hold-down cam plates, said adjusting means including a part carried by each of said cam frame sides having an inclined surface cooperating with an inclined surface of a cam plate, a clamp pin and slot connection holding said cam plate on said cam frame side, the slot being parallel to said inclined surfaces, and a turnable adjusting shaft mounted in said sides and having an eccentric engaging a vertical slot in each cam plate for moving said cam plates along said inclined surfaces to vary the height of the cams carried by the cam plates.

6. An imprinting machine, comprising in combination, a main frame having a base for supporting printing elements and sheets to be imprinted by said printing elements, a shiftable cam frame mounted on said base having forwardly projecting sides extending out over the printing area where the printing elements are supported, said cam frame sides each carrying a cam plate having a longitudinal hold-down cam on the lower surface over the printing area, an impression roll mounted on a roll shaft arranged for traversing movement beneath said hold-down cams, means for moving the roll shaft and impression roll on a forward printing stroke and a return idle stroke beneath said hold-down cams, roll shifting means for holding said shaft and impression roll down under pressure by said hold-down cams on the forward printing stroke and relieving the hold-down pressure on the return idle stroke of the shaft and impression roll, said roll shifting means including means for moving said cam frame and cam plates down when the roll is moving outward for printing and for releasing them to move upward when the roll is returning on the idle stroke, said cam frame shifting means including an oscillatable operating shaft mounted in said main frame having linkage connected to said roll to move it back and forth, said operating shaft having a wedge cam thereon, and a longitudinally shiftable wedge roller arranged between said shaft cam and said cam frame to be engaged beneath the cam on the forward stroke and released from its position beneath the cam on the idle return stroke.

7. An imprinting machine, comprising, in combination: a main frame having a platen base for holding imprinting elements and sheet material to be imprinted by said imprinting elements, an operating shaft mounted for oscillatory turning movement on said main frame; a roll pressure frame mounted for movement toward and away from said main frame; an impression roll mounted for movement on said main frame in a position to be moved toward said imprinting elements by said roll pressure frame; means operated by said operating shaft for reciprocating said roll out and back over said imprinting elements; and interacting means arranged between said operating shaft and roll pressure frame for moving said roll pressure frame down on the outstroke of said roll and for releasing said roll pressure frame to rise on the back stroke of said roll, said interacting means including a wedge cam on said operating shaft and a wedge roller mounted on said roll pressure frame for selective engagement with said wedge cam, said wedge cam on said operating shaft having an inclined cam portion engaging said wedge roller for moving said roll pressure frame down as the roll moves outwardly, a concentric portion for holding the wedge roller and pressure frame down while the roll moves over said imprinting elements, and a relief cam portion for releasing said wedge roller and pressure frame for movement to a raised position for the back stroke of said roll.

8. An imprinting machine, comprising in combination: a main frame having a platen base for holding imprinting element and sheet material to be imprinted by said imprinting elements; and operating shaft mounted for oscillatory turning movement on said main frame; a roll pressure frame mounted for movement toward and from said main frame; an impression roll mounted for movement on said main frame in a position to be moved toward said imprinting elements by said roll pressure frame; means operated by said operating shaft for reciprocating said roll out and back over said imprinting elements; an interacting means arranged between said operating shaft and said roll pressure frame for moving said roll pressure frame down on the out stroke of said roll and releasing said roll pressure frame to rise on the back stroke of said roll, said interacting means including a wedge cam on said operating shaft and a wedge roller on said roll pressure frame for selective engagement with said wedge cam, guide means on said pressure frame beneath said wedge cam for movement of said wedge roller longitudinally of said pressure frame, and spring means urging said wedge roller into an operative wedging position in said guide means beneath said wedge cam, said spring means and guide means cooperating with said wedge roller for movement of the wedge roller into an inoperative position when the wedge cam is turned reversely on the back stroke of said roll.

References Cited by the Examiner
UNITED STATES PATENTS

| | | | |
|---|---|---|---|
| 891,150 | 6/1900 | Crowley | 101—407 |
| 1,370,169 | 3/1921 | Turner | 101—407 |
| 1,919,954 | 7/1933 | Kranz | 101—274 |
| 2,051,890 | 8/1936 | Osborn | 101—274 |
| 2,295,748 | 9/1942 | Moore | 101—274 |
| 2,692,555 | 10/1954 | Gruver | 101—274 X |
| 2,795,186 | 6/1957 | Bach et al. | 101—269 |
| 3,077,828 | 2/1963 | Brugge et al. | 101—269 X |

WILLIAM B. PENN, *Primary Examiner.*